US010248409B1

(12) United States Patent
Pohlack et al.

(10) Patent No.: US 10,248,409 B1
(45) Date of Patent: Apr. 2, 2019

(54) LIMITING THE EFFECTS OF SOURCE CODE PATCHES ON CORRESPONDING NATIVE-CODE PATCHES

(71) Applicant: Amazon Technologies, Inc., Reno, NV (US)

(72) Inventors: Martin Thomas Pohlack, Dresden (DE); Uwe Dannowski, Moritzburg (DE); Geoffrey Plouviez, Dresden (DE)

(73) Assignee: Amazon Technologies, Inc., Reno, NV (US)

( * ) Notice: Subject to any disclaimer, the term of this patent is extended or adjusted under 35 U.S.C. 154(b) by 94 days.

(21) Appl. No.: 14/559,869

(22) Filed: Dec. 3, 2014

(51) Int. Cl.
*G06F 8/656* (2018.01)
*G06F 8/65* (2018.01)
*G06F 8/71* (2018.01)
*G06F 8/658* (2018.01)

(52) U.S. Cl.
CPC ............ *G06F 8/656* (2018.02); *G06F 8/65* (2013.01); *G06F 8/658* (2018.02); *G06F 8/71* (2013.01)

(58) Field of Classification Search
USPC ...................................................... 717/168
See application file for complete search history.

(56) References Cited

U.S. PATENT DOCUMENTS

| 5,778,231 A * | 7/1998 | van Hoff | G06F 8/54 |
| | | | 717/143 |
| 7,568,188 B2 * | 7/2009 | Fathalla | G06F 11/3688 |
| | | | 717/121 |
| 8,607,208 B1 * | 12/2013 | Arnold | G06F 8/67 |
| | | | 717/129 |
| 2001/0013119 A1 | 8/2001 | Agarwal | |
| 2004/0107416 A1 | 6/2004 | Buban et al. | |
| 2004/0111719 A1 | 6/2004 | Civlin | |
| 2004/0111721 A1 | 6/2004 | Civlin | |
| 2004/0128652 A1 * | 7/2004 | Mandava | G06F 11/3692 |
| | | | 717/124 |
| 2006/0288341 A1 | 12/2006 | Wurden et al. | |

(Continued)

OTHER PUBLICATIONS

Jeff Arnold et al, "Ksplice: Automatic Rebootless Kernel Updates", Proceedings of the 4th ACM European Conference on Computer Systems, 2009, pp. 187-198, United States.

(Continued)

*Primary Examiner* — Li B. Zhen
*Assistant Examiner* — Bradford F Wheaton
(74) *Attorney, Agent, or Firm* — Robert C. Kowert; Meyertons, Hood, Kivlin, Kowert & Goetzel, P.C.

(57) ABSTRACT

A code patching component may insert a binary patch into a native-code representation of a program during execution. Prior to inserting the binary patch, a patch code analysis tool may receive a source code patch for the program, and determine that applying the source code patch would change the binary for the program outside of the patched area (e.g., due to changes in the number of lines, changes in the file names or path information for source code files from which the program is built, or line directives that embed line numbers or file names in the binary for the patched program). The tool may modify the source code patch to limit its effects to the patch area by adding empty lines, merging of lines of code, or forcing a line number change. The tool may filter line directives to match previously embedded file name information.

22 Claims, 7 Drawing Sheets

(56) References Cited

U.S. PATENT DOCUMENTS

| | | | |
|---|---|---|---|
| 2010/0205587 A1 | 8/2010 | Dai et al. | |
| 2010/0250908 A1 | 9/2010 | Amann et al. | |
| 2011/0145803 A1* | 6/2011 | Soderstedt | G06F 8/66 717/154 |
| 2013/0104119 A1 | 4/2013 | Matsuo et al. | |
| 2013/0262419 A1* | 10/2013 | Kilian | G06F 17/2288 707/695 |
| 2014/0196003 A1* | 7/2014 | Sakimura | G06F 8/20 717/105 |
| 2014/0282459 A1* | 9/2014 | Hey | G06F 8/65 717/168 |

OTHER PUBLICATIONS

Developer Network, "Using the XML Diff and Patch Tool in Your Applications", Neetu Rajpal Microsoft Corporation, Aug. 29, 2002, pp. 1-4.

Martin Pohlack, "A design proposal forXen hotpatching", Amazon Web Services, Oct. 17, 2014, pp. 1-11.

* cited by examiner

LIMITING THE EFFECTS OF SOURCE CODE PATCHES ON CORRESPONDING NATIVE-CODE PATCHES

BACKGROUND

Software programs sometimes need to be patched (e.g., to correct an error, to implement a new feature, or for security reasons) after they have been released and are in use. For example, in systems in which functions, portions of functions or other code segments have been compiled into binary code representations of these functions or code segments, the compiled code sometimes needs to be replaced with new code that is compatible with the old code and its data structures. A code patching operation sometimes includes the insertion of code (sometimes referred to as a redirection patch) that redirects execution from one sequence of instructions to another. Other code patching operations include the replacement or insertion of code in the patch location itself (e.g., overwriting or augmenting existing code). Some existing techniques for performing binary patching require that all running threads of an executing program are halted while such a code patching operation is performed, e.g., in order to ensure that they are not affected by the patching.

A typical workflow for generating binary patches for a target program may include the following steps: start with the original source code and the originally generated binary, apply a source code patch (e.g., source code containing a functional correction or a security fix) to the original source code for the target program and create a new binary for the patched program, compare the two binaries to identify the locations within the binary code that have changed, and generate a binary patch based on this comparison. With a typical code patching workflow, small changes in one portion of the source code can sometimes have unintended side effects that ripple through unrelated portions of the binary code, even if no functional changes are made in the other portions of the source code.

Figure 1:
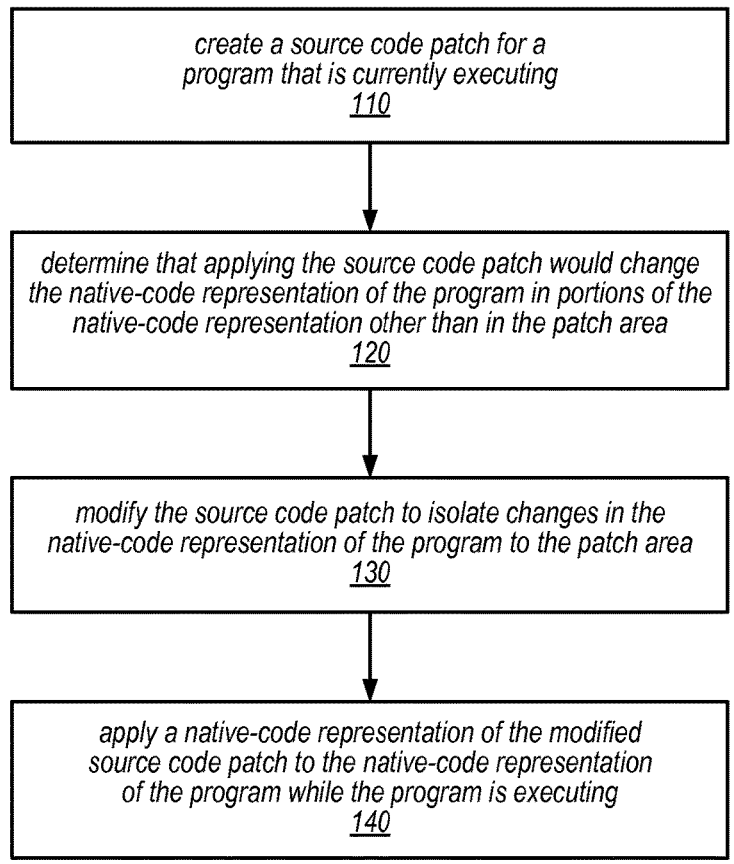
FIG. 1 is a flow diagram illustrating one embodiment of a method for performing runtime patching of native-code programs.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The systems and methods described herein may be used to perform runtime patching of native-code program instructions, such as a binary code representation of a portion of an executing program, while limiting the effects of the patching operation to the patched area. For example, in various embodiments, native-code instructions representing portions of functions, complete functions, or other program constructs may be replaced by, or augmented with, native-code instructions that implement a new behavior or a new feature, that correct an error in the code (e.g., a functional error), or that fix a security flaw in the code.

In some embodiments, runtime patching may be applied in high security systems and/or in systems with high availability requirements, so that they do not have to be shut down and then restarted in order to make changes to a target program. In such embodiments, native-code updates (which may be referred to herein as native-code patches or, in some cases, binary patches) may be generated for a target program and may be applied to the target program without having to rebuild the entire program. In other words, neither the target program nor the system in which it executes may need to be re-started with a new version of the binary for the target program that is re-created from a new version of the source code. Instead, updates to the target program may be made by applying the native-code patches to the affected portions of the code in the running system. For example, the native-code patches may be applied to the affected portions of the code by overwriting or augmenting existing code in each of the patch locations, or by inserting redirection patches in each of the patch locations that redirect execution from one sequence of instructions to another. In some embodiments, the techniques described herein may help to keep the binary patches small, which may be beneficial for several reasons, e.g., to simplify reasoning about them, to minimize any run-time performance overhead due to the introduction of many large patches, and/or to minimize run-time memory requirements due to the introduction of large patches.

As noted above, a typical workflow for generating binary patches for a target program may include accessing the original source code and the originally generated binary, applying a source code patch (e.g., source code containing a functional correction or a security fix) to the original source code for the target program, creating a new binary for the patched program, comparing the two binaries to identify the locations within the binary code that have changed, and generating a binary patch based on this comparison. With a typical code patching workflow, small changes in one portion of the source code can sometimes have unintended side effects that ripple through portions of the binary code other than those corresponding to the patched portion of the source code, even if no functional changes are made in other portions of the source code. In some embodiments, the techniques described herein may be used to isolate the changes in the binary of a target program due to the application of a given update using runtime patching to the portions of the program in which the changes are actually made, and may reduce or eliminate changes in other portions of the binary (e.g., those in which no functional changes are made) due to the application of the given update.

In some embodiments, when performing runtime patching, a native-code representation of the patch (e.g., a binary "blob") may be moved into the target program (e.g., into the memory of the system in which the target program is executing). In some existing systems, unintended side effects may be encountered in cases in which some information from the source code is directly represented in the binary as well. For example, in some cases, information from the source code of a target program may be embedded (e.g., by a compiler or pre-processor) in the native-code representation of the target program during the build process (e.g., for debugging purposes). In some cases, a change in the source code for a patch to the target program can change the information that will be embedded in the native-code representation of the target program following the patch. In other words, patching one portion of the code (e.g., an area in which functional changes were made in the source code) might inadvertently affect the embedded information in other portions of the code, even if no functional changes were made in the other portions of the code.

In one example, during a build process, some (or all) line numbers from the source code of a target program may be embedded in the binary representation of the target program (e.g., for debugging purposes) using a mechanism such as a "_LINE_" macro provided by the compiler. In this example, if a source code patch for the target program includes a different number of lines than the number of lines found in the original source code (in the patch area), the line numbers that are embedded in the binary representation of the target program may be changed not only in the patch area, but in other portions of the binary, even if (functionally) the change should only affect a small portion of the binary. For example, if the patch modifies the number of lines at the beginning of the target program or at some other early position in the code, it may cause a shift in the line numbers of all the functions that follow it, causing a ripple effect in the code outside of the patch area. In this example, if there are no other changes in the code outside the patch area (other than the embedded line numbers), from a semantic perspective, one would not expect any changes in the binary for the code (or functions) outside the patch area. However, since the new line numbers are directly embedded in the binary by the rebuilding process following the application of the source code patch, the code (or functions) outside the patch area will be changed anyway, thus requiring a much more extensive binary patch to be applied to the binary representation of the target program.

In another example, the file names for some or all of the files included in a build may be embedded in the binary representation of the target program (e.g., using a mechanism such as a "_FILE_" macro provided by the compiler). In addition, the process of recompiling the target program following the application of a source code patch may change one or more of these file names. Therefore, when the new binary is created for the target program following the application of a source code patch, these changes (which are not functional changes in the code) can cause unintended changes in the binary representation of the target program. While the examples included below describe techniques that may be used to limit the effects of source code changes on the binary representations of programs in systems in which specific types of source code information is embedded in the binary code (e.g., for debugging purposes, such as in order to include this information in error reports or code traces), similar techniques may be employed to limit other types of unintended side effects due to the application of source code patches, in other embodiments.

In some embodiments, the systems and methods described herein may be used to mitigate side effects of the patch process involving the insertion of information about the source code (including, but not limited to, debugging information) in the binary representation of the patched code, in which applying even a small source code patch can cause changes that ripple through a larger portion of the binary than would otherwise be affected by the source code patch (e.g., from a semantic point of view). For example, in some embodiments, the systems and methods described herein may be configured to determine whether applying a proposed source code patch would change the native-code representation of the program in portions of the native-code representation other than in the patch area and to modify the proposed source code in a way that minimizes the side effects of the source code patch on the binary of the target program (e.g., those due to changes in line number information or file name information that would be embedded in the native-code representation of the patched code by the build process following the application of the patch).

One embodiment of a method for performing runtime patching of native-code programs code is illustrated by the flow diagram in FIG. 1. As illustrated at 110, in this example, the method may include creating a source code patch for a program that is currently executing. The method may also include determining that applying the source code patch would change the native-code representation of the target program in portions of the native-code representation other than in the patch area, as in 120. In other words, it may be determined that the source code patch would create a change in the native-code (executable) representation of the program that would ripple through other portions of the code, requiring them to be updated along with the patched area.

As illustrated in this example, the method may include modifying the source code patch to isolate the changes in the native-code representation of the target program (changes due to the application of the source patch) to the patch area itself, as in 130. The method may also include applying a native-code representation of the modified source code patch to the native-code representation of the target program while the program is executing, as in 140. In some embodiments, applying a native code representation of the modified source code patch may include generating a native-code representation of the target program as patched, and creating the native-code representation of the patch dependent on the differences between the native-code representation of the program as it is currently executing and the native-code representation of the program as patched. Applying the native code representation of the modified source code patch may also include loading the native-code representation of the patch (e.g., binary code) into the memory space of the target program while it is executing.

Note that while the example shown in FIG. 1 and described above, as well as other examples included herein, illustrate embodiments in which an operation is performed to determine whether applying a proposed source code patch would change the native-code representation of the program in portions of the native-code representation other than in the patch area prior to modifying the proposed source code patch, in other embodiments, one or more modifications may be made to the proposed source code without first determining that they are needed. For example, in some embodiments, various filter operations or operations to insert line directives may be performed on all proposed source code patches to ensure that their effects will be isolated to the patch area, regardless of whether the proposed source code patches would, in fact, have changed the native-code representation of the program in portions of the native-code representation other than in the patch area. Note also that while several examples included herein illustrate and/or describe embodiments in which determining whether applying a proposed source code patch would change the native-code representation of the program in portions of the native-code representation other than in the patch area involves applying the proposed source code patch to the existing source code representation of the target program and comparing the patched source code to the original (unpatched) source code, in other embodiments, the determination may be made using other means. For example, in some embodiments, determining whether applying a proposed source code patch would change the native-code representation of the program in portions of the native-code representation other than in the patch area may include inspecting the proposed source code patch itself (without actually applying it to the existing source code representation of the target program) in order to ascertain its potential to cause these types of side effects.

As noted above, and unlike with some existing code patching approaches, in some embodiments, the code patching techniques described herein may not require that all other threads be halted while a code patching component of the system (e.g., a software module, or a process or thread thereof, that is configured to perform code patching) replaces, or augments, a portion of the native-code program instructions (e.g., binary code) of a currently executing program, process, or kernel. In other words, the techniques described herein may be used to perform runtime patching of native-code programs without having to pause the execution of those programs (or of various processes or threads thereof). In some embodiments, during execution of a program, a code patching component may insert a native-code representation of a source code patch into a native-code representation of the target program during execution. For example, in some embodiments, applying the patch may include modifying a binary representation of the target program code in the memory out of which it is executing by replacing binary elements at a location in the code binary (sometimes referred to herein as a "patch area") with other binary elements, thereby loading new code (e.g., writing a binary representation of a source code patch) into the memory space of the program being patched, overwriting at least a portion of the original, un-patched code, or by inserting binary elements that represent a redirection patch into the memory space of the program being patched, overwriting at least a portion of the original, un-patched code.

As previously noted, a debugging facility for programs written in C/C++ programs may employ a "_LINE_" macro to embed information in the binary representation of the programs that corresponds to the source code line numbering prior to pre-processing. For example, this macro is often used as parameter in debug messages to help the programmer to locate problems in the source code. As described above, a problem may arise when a source code patch changes the number of lines in the beginning of a source code version of the program being patch (i.e., when it adds or removes one or more lines), as this may result in changed source code lines at all subsequent locations in the code where those debug macros are used. As a consequence of this, many functions that follow a patched area may change in their binary form after compilation without really having changed at a semantic level. The techniques described herein for limiting the effects of runtime code patching may be further illustrated by way of example using the following pseudo code.

In this example, program code 1, shown below, represents the source code for a portion of a target program to which a source code patch is to be applied. Note that the line numbers shown below may not actually be included in the source code, but are shown below for clarity. When executed, this code produces the output, "Line 9".

```
1 #include <stdio.h>
2
3 void main(void)
4 {
5 int a;
6 int b;
7 int c;
8
9 printf("Line % d\n", _LINE_);
10 }
```

In this example, program code 2, shown below, represents the source code for the same portion of the target program shown in original program code 1, following the application of a multi-line source code patch in lines 8-12. Again note that the line numbers shown below may not actually be included in the source code, but are shown below for clarity. Note that in this example, the multi-line source code patch does not include functional code. However, in various embodiments, the multi-line source code patch may include functional code. When executed, this code produces the output, "Line 12".

```
1 #include <stdio.h>
2
3 void main(void)
4 {
5 int a;
6 int b;
7 int c;
8 /*
9 * this is a multi-line change
10 */
11
12 printf("Line % d\n", _LINE_);
13 }
```

Note that there are many different methods and/or utilities that may be used to represent the differences in the contents of two files, including the differences between two source code files for a program, process, or kernel, or between two native-code representations of a program, process or kernel, some of which may produce an output that is usable as an input to an operation for generating a native-code patch to be used in runtime code patching, in different embodiments. For example, some difference utilities may produce patch information (e.g., instructions for applying a source patch code by adding, deleting, or modifying portions of the code) in a standard format that is understood by various code patching components and/or patch code analysis tools.

One representation of the differences between program code 1 shown above (e.g., the source code for an unpatched portion of a program) and program code 2 shown above (e.g., the source code for a patched version of the program) is shown below, according to a standard difference format. In this example, each of the lines added in program code 2 (e.g., each of lines 8-10) is marked by the "+" symbol at the beginning of the line.

```
--- test.c 2013-11-21 15:51:44.043688074+0100
+++ test_patched.c 2013-11-21 15:52:44.271686756+0100
@@ -5,6 +5,9 @@
   int a;
   int b;
   int c;
+ /*
+ this is a multi-line change
+ */
  printf("Line % d\n", _LINE_);
}
```

Since the change to the source code introduced in lines 8-10 would change the line numbering of the source code, the line number information that would be embedded in the binary representation of the patched source code (in this, and potentially in other portions of the source code) would also change. For example, if there were additional lines of code following the print statement in the main function, all of the subsequent line numbers in that main function (and, in some cases, the line numbers in other functions that succeed this function in the source code) will change. In some embodiments, the systems described herein may be configured to isolate the changes to the binary representation of the target program due to the source code patch described above by transforming the changes made in the source code patch so that they are neutral in terms of the number of lines of code that make up a particular function, a particular portion of a function, or another program construct that is the specific target of the source code patch (e.g., in the particular "hunk" of code that is the target of the patch, where a "hunk" of code is the unit of change in a source code representation of a patch). For example, in some embodiments, a proposed source code patch may be modified such that the number of lines added (if any) is equal to the number of lines removed (if any) by the application of the source code patch.

Depending on the format of a patch, the patch may include some metadata about the target area (e.g., information about the affected line numbers, etc.), some number of lines of code for context (e.g., unaffected lines in the same hunk of code), and the actual lines of code that are to be removed or added. In some formats, modified lines may be represented as a combination of removed lines (shown by a "−" marker, followed by the old content) and added lines (shown by a "+" marker, followed by new content). In some embodiments of the systems described herein, if the number of lines of code in a hunk of code would be changed by the application of a proposed source code patch, the proposed source code patch may be modified prior to its application to the target code in order to reduce (or eliminate) these changes, therefore reducing (or eliminating) the chance that they will cause an unintended ripple effect in other hunks of the target program, process, or kernel. For example, if a proposed source code patch would remove lines of code from a hunk of code (e.g., if the application of the source code patch would result in a net reduction in the number of lines of code in the hunk), one or more additional lines of code (e.g., empty or otherwise non-functional lines of code) may be inserted in the proposed source code patch to produce a modified source code patch that is neutral in terms of the number of lines of code that will be included in the hunk of code before and after applying the patch. Conversely, if a proposed source code patch would add lines of code to a hunk of code (e.g., if the application of the source code patch would result in a net increase in the number of lines of code in the hunk), two or more lines of code may be merged onto a single line of code in the source code patch (where the syntax of the program allows), or each of multiple single lines of code may be modified to include information from one or more additional lines of code, to produce a modified source code patch that is neutral in terms of the number of lines of code that will be included in the hunk of code before and after applying the patch. In some embodiments, such changes to a proposed source code patch (e.g., changes that preserve the number of lines in the hunk of code that is the target of the proposed source code patch) may also preserve the line numbering in one or more other hunks of code that follow the target hunk in the source code of the program being patched.

In some embodiments, and depending on the syntax of the particular programming language in which the source code is written, most (if not all) additional lines of code that are included in a proposed source code patched may be merged onto a single new or existing line of code in the hunk of code being patched without affecting the semantics or functionality of the patched code. In some cases, the hunk of code and/or the proposed source code patch may include preprocessor macros that must be placed on their own lines. However, between the lines of code that can be merged onto single lines of functional code and/or that may replace any empty lines (or unnecessary comment lines) that were included in the unpatched hunk of code, it may be the case that, for the vast majority of relatively small source code patches (including the vast majority of security patches), all additional lines of code introduced by a source code patch may be inserted into the target hunk of code such that the net effect on the number of lines of code in the hunk of code is neutral. Note that while a source code patch that has been modified in this manner may be less readable than the originally proposed source code patch, the modified source code may not serve as the canonical representation of the patch. Instead, the originally proposed version of the source code patch may be retained for readability. In some embodiments, the systems described herein may implement an automated mechanism for transforming a proposed source code patch from its original form into the modified form (e.g., a compressed form) and may actually apply the compressed form, while retaining the original form for the use of the programmer (e.g., in reasoning about the original behavior of the source code patch and it effect on the target program as a whole). Note, however, that in some embodiments, a debugging facility may, when presenting information about the patched program during executing, return the line numbers of the modified source code patch (e.g., the line numbers of the compressed patch, where each line may include multiple program instructions that were merged onto a single line), rather than the line numbers of the original target program. In other embodiments, a debugging facility may be configured to translate the line numbers of the compressed patch back to the line numbers of the originally proposed source code patch before presenting them, in this situation. Note however, that the techniques described herein may be primarily employed in performing runtime patching of an executing program in a production system, and that it is, therefore, unlikely that a debugger would be in use in this situation.

Figure 2:
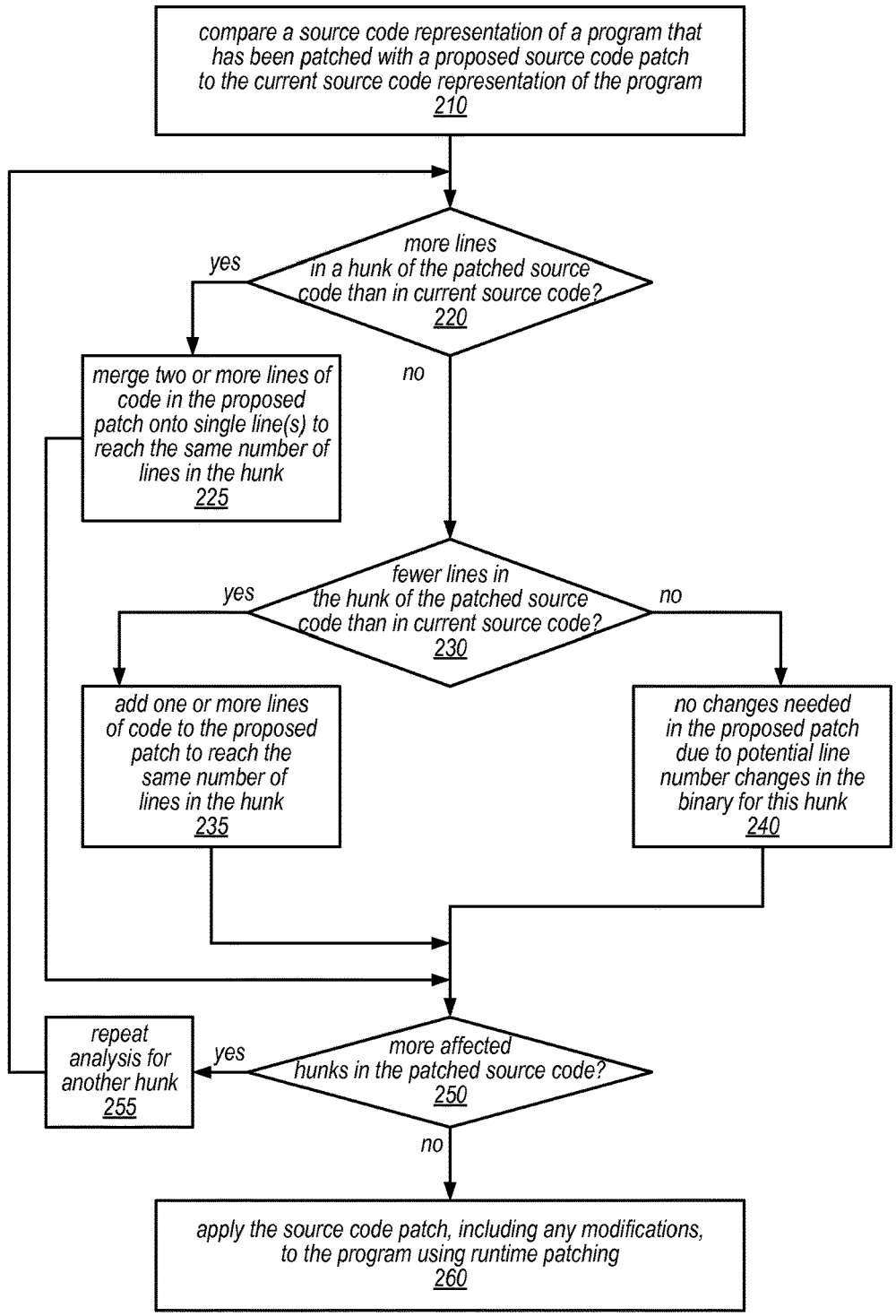
FIG. 2 is a flow diagram illustrating one embodiment of a method for modifying a proposed source code patch to avoid changing the number of lines in the patched source code.

One embodiment of a method for modifying a proposed source code patch to avoid changing the number of lines in the resulting patched source code is illustrated by the flow diagram in FIG. 2. As illustrated at 210, in this example, the method may include comparing a source code representation of a program that has been patched with a proposed source code patch to the current (unpatched) source code representation of the program. If there are more lines of code in a given hunk of the patched source code than in the corresponding hunk in the current source code representation of the program, shown as the positive exit from 220, the method may include merging two or more lines of code in the proposed source code patch onto single line(s) in the proposed source code patch to reduce the number of lines in the patch area so that the number of lines of code in the given hunk matches the number of lines of code in the given hunk in the current (unpatched) source code representation of the program, as in 225. In other words, multiple lines of code may be merged onto one line of code to produce a modified source code patch, or multiple merging operations may be performed such that two or more lines of code are merged onto each of several different single lines of code in the proposed source code patch to produce a modified source code patch.

Conversely, if there are fewer lines of code in the given hunk of the patched source code than in the corresponding hunk in the current source code representation of the program, shown as the positive exit from 230, the method may include adding one or more lines of code to the proposed patch to increase the number of lines in the patch area so that the number of lines of code in the given hunk matches the number of lines of code in the given hunk in the current (unpatched) source code representation of the program, as in 235. For example, non-functional lines (e.g., blank lines or comment lines) or lines containing non-functional code (e.g., NOP type instructions) may be inserted in the proposed source code patch to produce a modified source code patch. If the number of lines of code in the given hunk in the patched source code is the same as the number of lines in the corresponding hunk in the current source code representation of the target program (shown as the negative exit from 230), no changes may be needed in the proposed source code patch due to potential line number changes in the binary for this hunk, as shown in 240.

As illustrated in this example, if there are more hunks of code that are potentially affected by the proposed source code patch (shown as the positive exit from 250), the method may include repeating the analysis (and, if necessary, one of the corrective actions) for each of the other hunks. This is shown in FIG. 2 by the path from the positive exit of 250 to 255, and from 255 to 220. If there are no additional hunks of code that are potentially affected by the proposed source code patch, or once the analysis and any corrective actions have been applied to all of the potentially affected hunks (shown as the negative exit from 250), the method may include applying the source code patch, including any modifications made at 225 or 235 for one or more hunks, to the target program using runtime patching of the binary representation of the program, as in 260. Note that if no changes were needed in the proposed source code patch, the proposed source code patch may be applied to the target program without modification using runtime patching of the binary representation of the program.

The modification of a proposed source code patch in order to retain the original number of lines in the target hunk of code may be further illustrated in the representation of the modified patch shown below, according to at least one embodiment. More specifically, this example illustrates a modification to the representation of the differences between program code 1 and program code 2 that was presented above that includes the merging of multiple lines of code onto a single line of code.

```
--- test.c 2013-11-21 16:01:40.271675027+0100
+++ test2.c 2013-11-21 16:02:53.787673418+0100
@@ -4,7 +4,7 @@
{
int a;
int b;
- int c;
+ int c; /* this is a multi-line change */
printf("Line %d\n", __LINE__);
}
```

In this example, the comment "this is a multi-line change", which took up three lines in the originally proposed source code patch has been merged with the previous line in the code so that the number of lines of code in the patched hunk of code is not changed by the application of the source code patch. As noted above, in many programming languages, including the C/C++ programming languages, multiple functional program instructions may be combined on a single line in the source code, as long as the proper instruction delimiters and other syntax elements are present.

In some embodiments, rather than modifying a proposed source code patch to retain the same number of lines of code in the targeted hunk of hunk as the number of lines of code that exist in the unpatched hunk of code, as in the example described above, the proposed source code patch may be modified such that it appears (e.g., to the build process that generates a new binary for the patched program, process, or kernel) as if the line numbering in the patched hunk did not due to the application of the patch. In such embodiments, the systems described herein may directly control the notion of line numbering in the source code and, thus, may control the line number information that will be embedded in the binary representation of the patched program. For example, a proposed source code patch may be modified to include one or more directives (e.g., pre-processor directives or compiler directives, such as a #line directive) that force the line number information that will be included by the build process (e.g., by a pre-processor or compiler) for a particular line to a specified value, effectively resetting the current line number at that point. In this example, the line number information for the lines of code that follow the line on which such a directive is included may reflect the fact that the current line number was reset at that point, such that the succeeding lines are numbered in sequential order starting with the line number that would follow the specified line number in sequential order (regardless of the actual positions of those lines of code with respect to the beginning of the source code for the target program or the beginning of the target hunk of code that is being patched).

In this example, during the build process that follows the application of a source code patch, any such explicit line number directives that have been inserted in the modified source code patch may directly control what line in the source code the compiler thinks it is working on. Note that, in this example, the compiler may not actually operate on the source code as written, but on source code that has been transformed during pre-processing. In this example, the artificial line number information that is embedded by the pre-processor (based on the explicit line number directives in the modified source code patch) may provide the compiler with the information it needs to determine which lines of the source code for the target hunk of code and/or for the source code of the target program, process, or kernel of which the hunk of code is a part have actually been changed in the code. In other words, the presence (or absence) of artificial line number information may serve to distinguish between intentional changes that were made in the source code and unintended side effects in the code due to a change in the number of lines in a hunk of code by the application of a source code patch.

In some embodiments, the line number information for a particular line of code in target hunk of code may be explicitly specified using the same mechanism that the pre-processor would use to communicate the original line numbers to the compiler, e.g., the #line directive. For example, a proposed source code patch may be modified to include an explicit #line directive (e.g., in each affected hunk of code) in order to set the line number value for a particular line of code (e.g., the last line of code in the hunk of code, the first unmodified line of code in the hunk of code following the patched portion of the hunk of code, or the first line of a hunk of code that follows a patched hunk of code) to the value of the corresponding line in the unpatched version of the source code of the program, process, or kernel that is being patched. Note that in some cases, when employing explicit line number directives, there may be duplicate line numbers embedded in the resulting native-code representation of the patched program (e.g., with a single line number value being associated with an artificially numbered line of code and also with the line of code that originally, or naturally, would be associated with that same line number value). However, these duplications may be limited to the line numbers for the lines of code in the hunks of code to which source code patches were actually applied.

Figure 3:
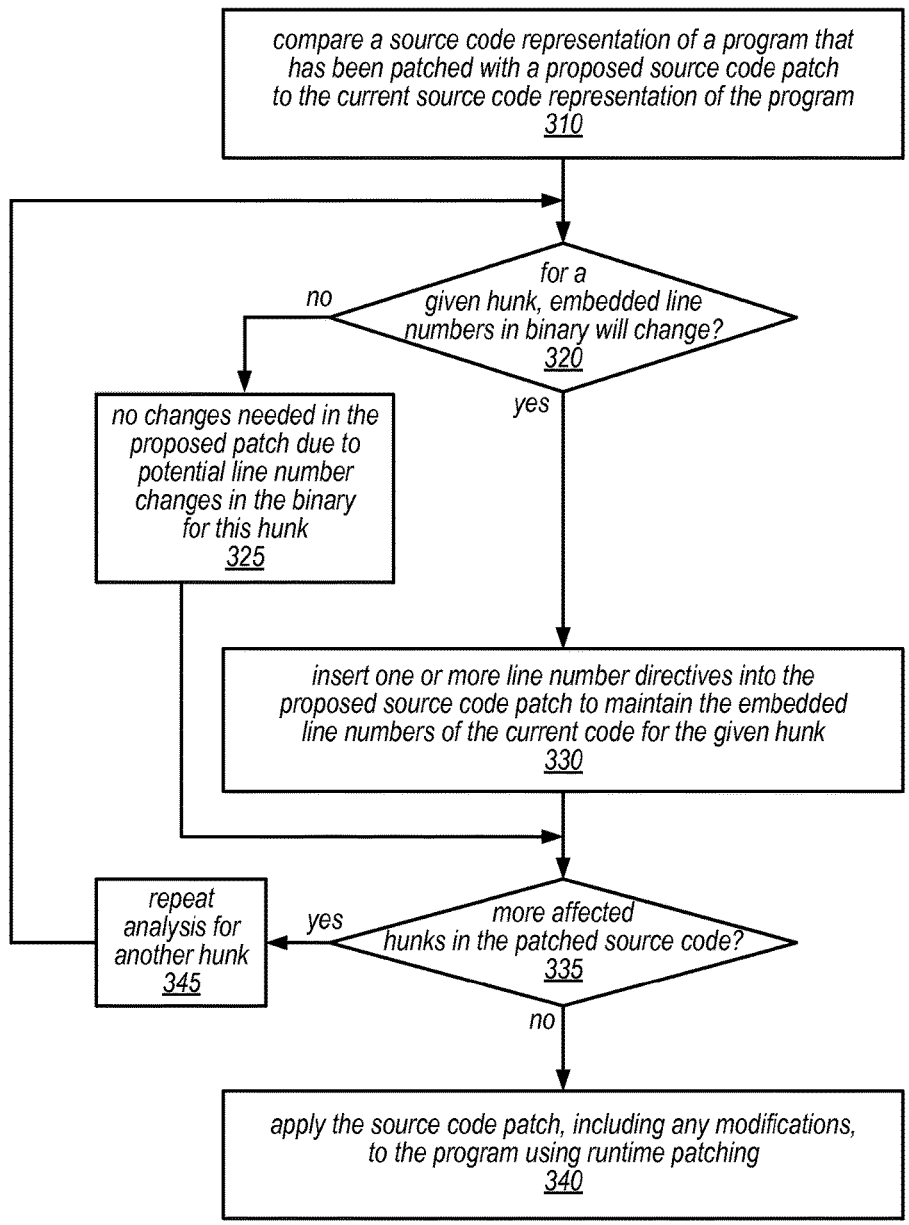
FIG. 3 is a flow diagram illustrating one embodiment of a method for modifying a proposed source code patch to retain line number information that is embedded in an executable representation of the patched source code.

One embodiment of a method for modifying a proposed source code patch to retain line number information that is embedded in an executable representation of the patched source code is illustrated by the flow diagram in FIG. 3. As illustrated at 310, in this example, the method may include comparing a source code representation of a program that has been patched with a proposed source code patch to the current source code representation of the program. If, were the program to be rebuilt using the patched source code, one or more line numbers of a given hunk that are embedded in the resulting binary representation of the patched program would change (relative to the currently executing binary representation of the program), shown as the positive exit from 320, the method may include inserting one or more explicit line number directives into the proposed source code patch to maintain the embedded line numbers of the current code (for the given hunk) were the program to be rebuilt using the proposed source code patch (as modified), as in 330.

On the other hand, if, were the program to be rebuilt using the patched source code, none (if any) of the line numbers of the given hunk that are embedded in the resulting binary representation of the patched program would change (relative to the currently executing binary representation of the program), shown as the negative exit from 320, no changes may be needed in the proposed patch due to potential line number changes in the binary for this hunk, as shown at 325. As illustrated in this example, if there are more hunks of code that are potentially affected by the proposed source code patch (shown as the positive exit from 335), the method may include repeating the analysis (and, if necessary, a corrective action) for each of the other hunks. This is shown in FIG. 3 by the path from the positive exit of 335 to 345, and from 345 to 320. If there are no additional hunks of code that are potentially affected by the proposed source code patch, or once the analysis and any corrective actions have been applied to all of the potentially affected hunks (shown as the negative exit from 335), the method may include applying the source code patch, including any modifications made at 325 for one or more hunks, to the target program using runtime patching of the binary representation of the program, as in 340. Note that if no changes were needed in the proposed source code patch, the proposed source code patch may be applied to the target program without modification using runtime patching of the binary representation of the program.

The modification of a proposed source code patch in order to retain the line numbering that would be embedded in the binary version of the target program following the application of the source code patch (at least in the portions of the target program outside of the patch area) may be further illustrated in the representation of the modified patch shown below, according to at least one embodiment. More specifically, this example illustrates a modification to the representation of the differences between program code 1 and program code 2 that was presented above that includes the insertion of an explicit line number directive following the portion of the code that includes a multi-line change.

```
--- test.c 2013-11-21 16:01:40.271675027+0100
+++ test3.c 2013-11-21 16:05:30.119669997+0100
@@ -5,6 +5,10 @@
   int a;
   int b;
   int c;
+ /*
+ this is a multi-line change
+ */
+#line 8
   printf("Line %d\n", __LINE__);
}
```

In this example, even though the target hunk of code includes more lines of code than the unpatched version of this hunk of code, by explicitly resetting the line number to a value of "8" prior to the print statement, the output of this hunk of code may be identical to that of the unpatched version of the hunk of code. In addition, the use of this explicit line number directive may eliminate any changes in the code (or runtime behavior) for other functions that follow this patched version of the hunk of code due to the change in the number of lines of code in the patched hunk of code.

As described in more detail below, in some embodiments, the types of modifications described above that may be made to a proposed source code patch in order to limit the effects of a change in the number of lines in the patched code and/or the determination that such modifications should be made to a proposed source code patch may be performed automatically by a code patching component or a patch code analysis tool.

As previously noted, in some systems, the file names for some or all of the source files that are included in a build may be embedded in the binary representation of the target program (e.g., using a "__FILE__" macro). In such systems, the current file name (e.g., an absolute or relative path name for the file name) can be accessed from the source code using this macro. However, if a program or kernel (or a portion thereof) is subsequently built at a different location (e.g., if the program/kernel, or a portion thereof, is rebuilt following the application of one or more source code patches to respective target hunks of code), or if parts of its structure are renamed, different file names may be embedded in the binary by the building process. For example, changes may be made to the embedded file names due to the actual renaming of a source file, or a binary representation of a source code patch may be built in a different directory (and/or under a different account) such that the embedded file name information in the binary representation of the patched source code and, potentially, in the binary representation of the source code for the program/kernel for the other source files from which the program/kernel is built, may include completely different path information for those files. For programs or kernels that include a large number of source files, this can result in a lot of changes in the overall binary for the program or kernel.

In some embodiments, the effects of such file name changes may be mitigated through the use of an additional pre-processing stage when rebuilding the program/kernel following the application of a source code patch (or when rebuilding the program/kernel in a different location for any other reason). For example, the additional pre-processing state may be performed after an initial language-specific pre-processing stage has dealt with the various macros or pre-processing directives in the source code, including, but not limited to, those described herein (e.g., after a C/C++ pre-processing stage) but before the code is fed to the compiler. In such embodiments, the additional pre-processing stage may be configured to filter the embedded file name directives (e.g., replacing line directives in the source files with other line directives, or modifying them using string operations) such that the generated file names correspond as closely as possible to those generated for the environment of the original build. In one example, the pre-processor may filter the embedded line directives such that the uncommon portions of the file names are stripped off, reducing the file names to relative file names with respect to the root directory for the program/kernel project. In this way, the embedded directory names may be identical following a rebuilding operation. More specifically, if it is known where an original version of the project was built and where a new version of the project was built, a filtering operation may be applied to the two directory paths to find the first non-identical portion of the two paths (i.e., to identify the root directories for the two directory paths, and the points at which their directory trees begin to diverge). For example, file name/path information may be captured as part of the original build process or may be extracted from debugging information that is deeply embedded in the original binary or that is directly included in the original binary. Once this information has been determined, the file names (as the compiler would generate them) may be replaced with file names for which the uncommon portions have been stripped off. Note that in embodiments in which the build operation uses local or relative file names (rather than complete path names), there may be multiple files in the system that have the same names. In order to prevent false positives when determining which of the files has been changed since the last build (e.g., by the application of a source code patch or for any other reason), each of the file names may be transformed into its canonical form before attempting to match the original files with the files to be used when rebuilding the program/kernel.

Figure 4:
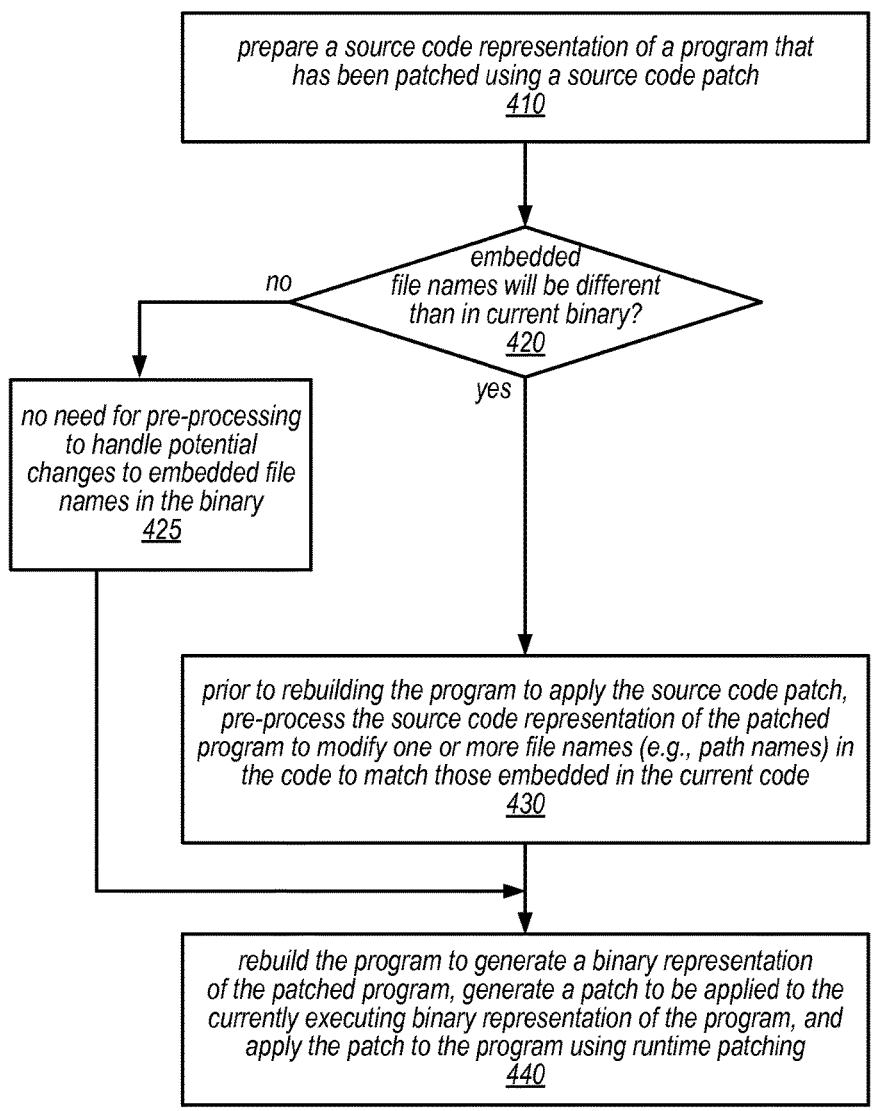
FIG. 4 is a flow diagram illustrating one embodiment of a method for pre-processing patched source code to retain file name information that is embedded in an executable representation of the patched source code.

One embodiment of a method for pre-processing patched source code to retain file name information that is embedded in an executable representation of the patched source code is illustrated by the flow diagram in FIG. 4. As illustrated at 410, in this example, the method may include preparing a source code representation of a program that has been patched using a source code patch. Note that in this example, the source code patch may have been written so as to avoid potential changes in embedded line number information, or may have been modified due to potential changes in embedded line number information that would have been produced by applying an originally proposed source code patch. As illustrated in FIG. 4, if it is determined that one or more file names that would be embedded in the binary representation of the target program as patched would not be different than those embedded in the current binary representation of the target program, shown as the negative exit from 420, there may be no need for pre-processing the source code representation of the patched program to handle potential changes to embedded file names in the binary representation of the program, as shown in 425.

If, however, if it is determined that one or more file names that would be embedded in the binary representation of the target program as patched would be different than those embedded in the current binary representation of the target program, shown as the positive exit from 420, the method may include, prior to rebuilding the target program to apply the source code patch, pre-processing the source code representation of the patched program to modify one or more file names in the code (e.g., one or more embedded path names for files that are included in the build) to match those embedded in the current binary representation of the target program, as in 430. As noted above, this may include filtering the embedded line directives such that the generated file names correspond as closely as possible to the environment of the original build. As illustrated in this example, regardless of whether or not a pre-processing operation was performed to modify any file names that would be embedded in the binary representation of the target program as patched, the method may include rebuilding the target program to generate a binary representation of the patched program, generating a patch to be applied to the currently executing binary representation of the program (e.g., based on the differences between the current code and the patched code), and applying the patch to the program the using runtime patching of the binary representation of the program, as in 440.

The techniques described herein for filtering the line directives for embedded file names may be further illustrated by way of the following examples. In one example, if the original binary was built in "/home/user1/projectx/" and is now being rebuilt in "/home/user2/projectx.new/", all (or most) occurrences of "user1" may need to be changed into "user2", and all (or most) occurrences of "projectx" may need to be changed into "projectx.new". As noted above, some line directives may not contain a full (absolute) path, but only a relative path, such as "../file.h" or "file.c". In these cases, it may not be necessary to make any changes to the file names.

As noted above, in order to prevent false positive matches, that is, name patterns being repeated in sub-trees that should not be changed, each path name may be transformed into its canonicalized form before matching. In one example, the path "./lib1/projectx.new/file1" might be canonicalized to "/home/user1/projectx/lib1/projectx.new/file1" (representing the original version) and to "/home/user2/projectx.new/lib1/projectx.new/file1" (representing the new version). As illustrated in these examples, the replacement should only be done in the first parts of the canonicalized path, that is, in "/home/user1/projectx/" or in "/home/user2/projectx.new/". In some embodiments, the final adapted file name may be transformed back into its original form (for example, its non-canonicalized form) to be as similar as possible to the file name in the original build.

In some cases, native-code patches that have been generated from source code patches may be published (e.g., by a vendor or publisher of the target programs to which they can be applied) for subsequent application by consumers of the target programs. In some embodiments, native-code patches that have been generated for source code patches that have been modified using the techniques described herein may contain special signatures or may be recognizable due to their adherence to a special format. For example, it may be possible to determine, by examining such a patch, that multiple lines of code in a source code patch have been merged onto a single line in the source code patch, that additional empty (or otherwise non-functional) lines have been added to a source code patch, and/or that the number of lines in a source code patch for a hunk of code has obviously (and unnaturally) been constrained so that the patched hunk of code will have the same number of lines as an unpatched version of the hunk of code. In another example, it may be possible to determine, by examining such a patch, that one or more artificial line directives (for changing embedded line number information and/or file name information) have been inserted into the patched hunk of code.

As previously noted, some embodiments, techniques described for limiting the effects of a source code patch on the resulting binary may be performed automatically by a code patching component or a patch code analysis tool. For example, in some embodiments, at least some of the operations that are performed in order to determine that the types of modifications described herein should be made to a proposed source code patch and/or the operations that are performed in order to make those modifications and generate a patch suitable for use in runtime patching of a program, process, or kernel, may be performed automatically by a code patching component or a patch code analysis tool. In some embodiments, a code patching component or a patch code analysis tool may be configured to transform a proposed source code patch for each of multiple hunks of code in a target program, process, or kernel in turn (e.g., adding lines, merging lines, modifying line directives, or inserting line directives in each of the hunks, where appropriate). In other embodiments, a patch code analysis tool may determine whether a patching or rebuilding operation for target program would benefit from the modification of one or more source code patches, and may return that information for the use of a programmer or for the use of a separate (or integrated) code patching component, which may perform the recommended modifications and then generate and apply (or publish) a corresponding native-code patch for the target program. In some embodiments, a code patching component, patch code analysis tool, or debugging facility may include an automated mechanism that is configured to determine (e.g., based on a particular tag or other meta information) that particular line numbers in the executing code are covered by runtime patches. In such embodiments, any debugging information that is returned for the code in those areas during debugging may not match the debugging information that would have been returned for the original source code of the corresponding functions (or portions thereof), and the automated mechanism may return an indication to that effect.

Figure 5:
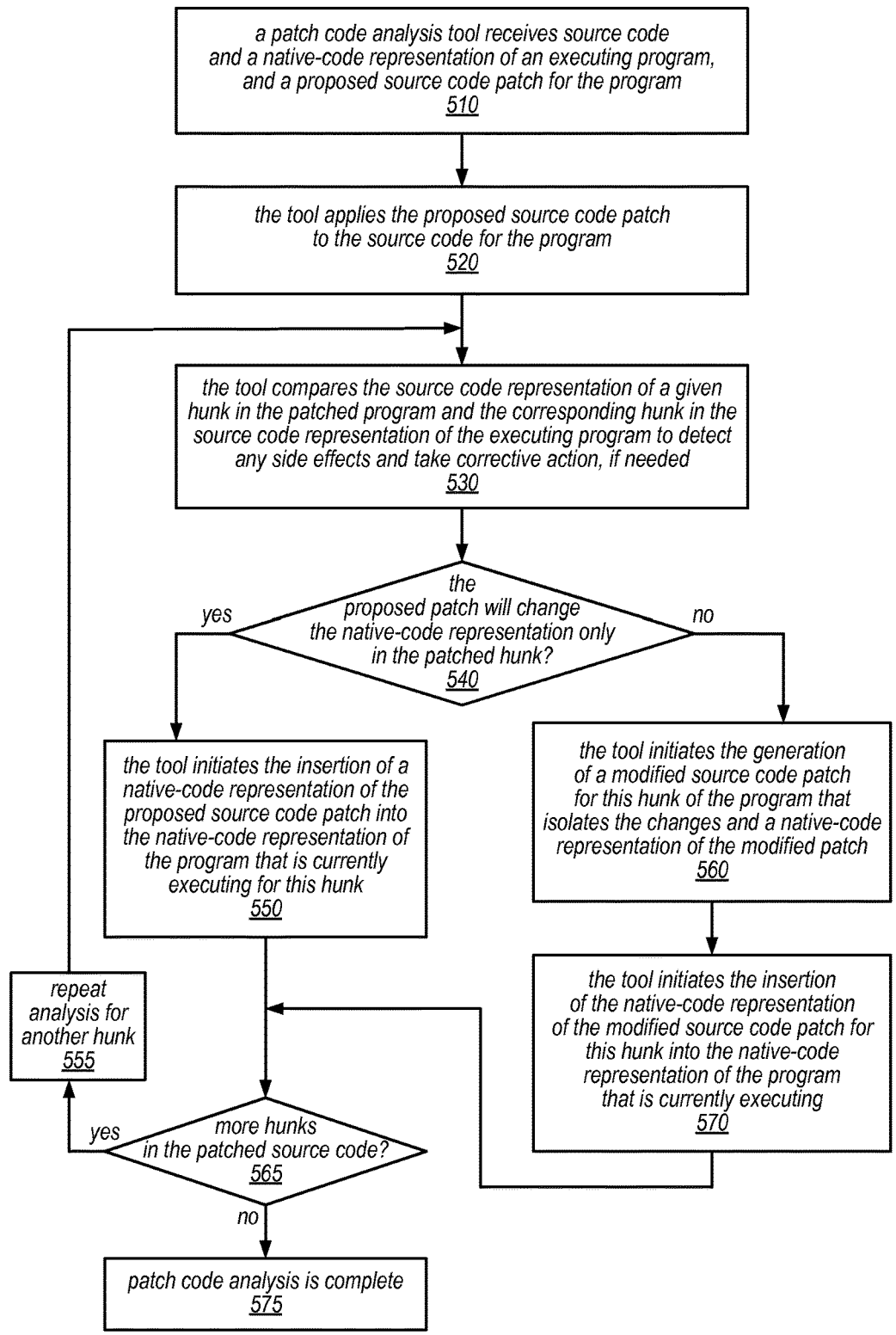
FIG. 5 is a flow diagram illustrating one embodiment of a method for limiting the effects of runtime code patching using a patch code analysis tool.

One embodiment of a method for limiting the effects of runtime code patching using a patch code analysis tool is illustrated by the flow diagram in FIG. 5. As illustrated at 510, in this example, the method may include a patch code analysis tool receiving a source code representation and a native-code representation of an executing program, and a proposed source code patch for the program. The method may include the tool applying the proposed source code patch to the source code for the target program, as in 520. The method may also include the tool comparing the source code representation of a given hunk in the patched program and the corresponding hunk in the source code representation of the executing program to determine whether there are any undesirable side effects and, in some cases, to take corrective action, as in 530. For example, if it is determined that applying the proposed source code patch would change the native-code representation of the target program only in the patch area (e.g., in the given hunk), shown as the positive exit from 540, the method may include the tool initiating the insertion of a native-code representation of the proposed source code patch into the native-code representation of the program that is currently executing (for this hunk), as in 550. For example, inserting a native-code representation of the proposed source code patch may include generating a native-code representation of the affected portion of the target program as patched (e.g., for the given hunk) and creating the native-code representation of the source code patch (for the given hunk) dependent on the differences between the native-code representation of the given hunk in the program as it is currently executing and the native-code representation of the given hunk in the program as patched.

As illustrated in this example, if it is determined that applying the proposed patch would change the native-code representation of the target program in portions of the code other than in the patch area (e.g., other than in the given hunk), shown as the negative exit from 540, the method may include the tool initiating the generation of a modified source code patch for the given hunk in the program that isolates the changes to the given hunk and a native-code representation of the modified source code patch, as in 560. In this case, the method may also include the tool initiating the insertion of the native-code representation of the modified source code patch for the given hunk into the native-code representation of the program that is currently executing, as in 570. As in the previous example, inserting a native-code representation of the modified source code patch for the given hunk may include generating a native-code representation of the affected portion of the target program as patched (e.g., for the given hunk) and creating the native-code representation of the modified source code patch (for the given hunk) dependent on the differences between the native-code representation of the given hunk in the program as it is currently executing and the native-code representation of the given hunk in the program as patched.

As illustrated in FIG. 5, if there are more hunks of code that are potentially affected by the proposed source code patch (shown as the positive exit from 565), the method may include repeating the analysis (and, if necessary, a corrective action) for each of the other hunks. This is shown in FIG. 5 by the path from the positive exit of 565 to 555, and from 555 to 530. If there are no additional hunks of code that are potentially affected by the proposed source code patch, or once the analysis and any corrective actions have been applied to all of the potentially affected hunks (shown as the negative exit from 565), the patch code analysis (and correction) may be complete, as in 575. Note that if no changes were needed in the proposed source code patch, the result of the method illustrated in FIG. 5 may be that the proposed source code patch is applied to the target program without modification using runtime patching of the binary representation of the program.

Note that the techniques described herein for performing runtime patching and/or for limiting the effects of source code patching on binary representations of a target program may, in various embodiments, be performed by a code patching component and/or patch code analysis tool of an operating system, hypervisor, debugger, or other privileged program or process that is invoked automatically (e.g., in response to detection of an error in self-correcting code) or in response to an explicit invocation of a runtime patching operation by programmer, system administrator or other privileged user or process owner. In some embodiments, a compiler or another component of an operating system, hypervisor, debugger, or other privileged program or process may be configured to perform a rebuilding operation to generate a complete new native-code representation of a target program following the application of a source code patch to the source code of the target program. The compiler or other component may also be configured to determine which source files, functions, and/or hunks of code were materially (e.g., functionally) modified by the source code patch, to re-use existing native-code representations for the source files, functions, and/or hunks of code that were not materially changed, to generate native-code patches for the source files, functions, and/or hunks of code that were materially changed (e.g., based on the difference between the new native-code representation of the target program and the current native-code representation of the target program), and to rebuild the target program from a combination of re-used native code and the native-code patches.

Figure 6:
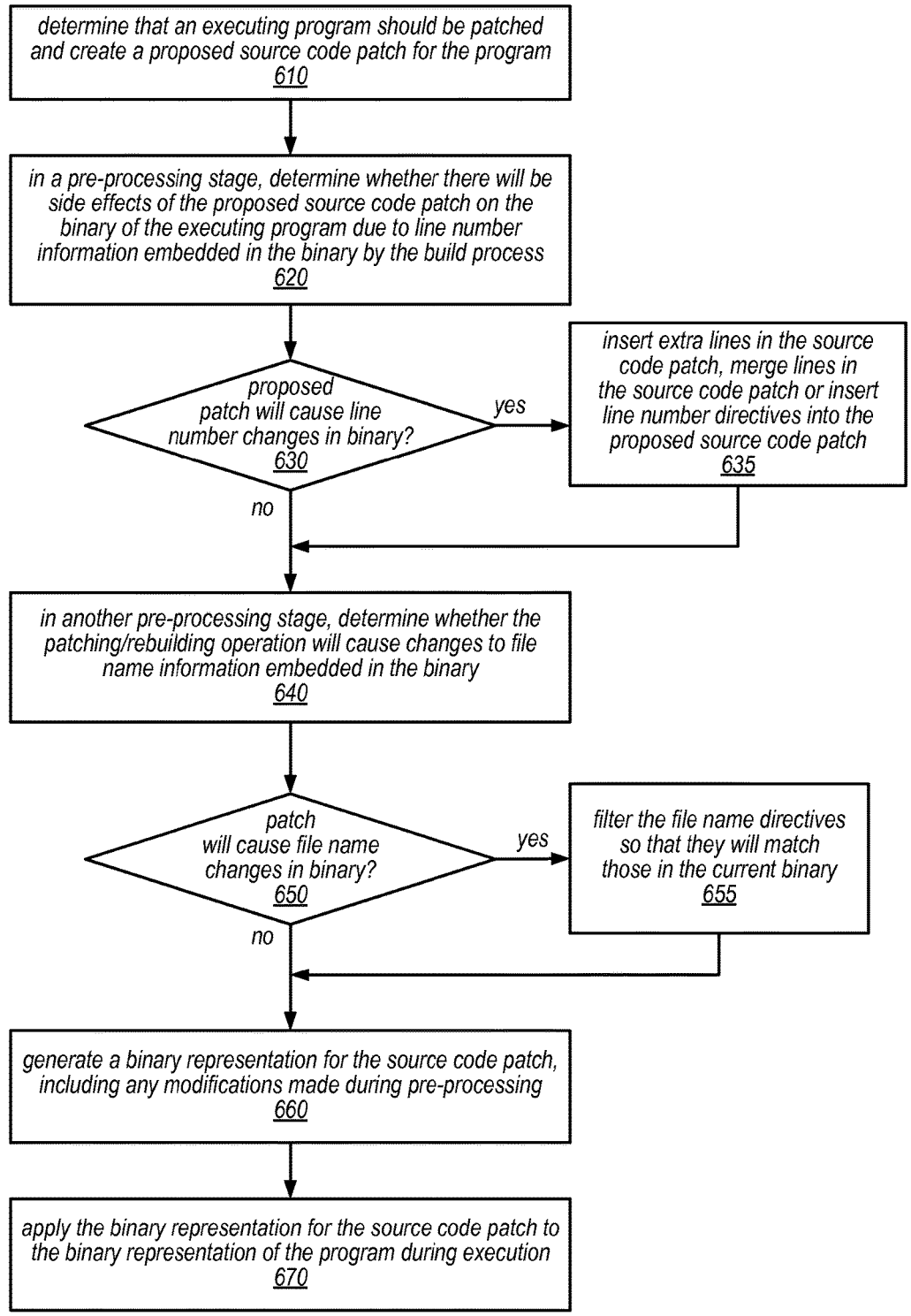
FIG. 6 is a flow diagram illustrating one embodiment of a method for employing the code patching techniques described herein.

One embodiment of a method for employing the code patching techniques described herein is illustrated by the flow diagram in FIG. 6. As illustrated at 610, in this example, the method may include determining that an executing program should be patched (e.g., for security reasons, to modify its functionality, or to correct a functional error) and creating a proposed source code patch for the program. The method may also include, in a pre-processing stage, determining whether there would be any side effects of applying the proposed source code patch on the binary of the executing program due to line number information that would be embedded in the binary representation of the target program by the build process, as in 620. For example, if applying the proposed source code patch would cause changes to any line numbers that are embedded in the binary, shown as the positive exit from 630, the method may include inserting one or more extra lines of code in the source code patch, merging multiple lines of code in the source code patch onto single line(s), or inserting one or more explicit line number directives into the source code patch (creating a modified source code patch), as in 635.

As illustrated in this example, the method may include, in another pre-processing stage, determining whether there will be side effects on the binary of the executing program (e.g., changes to the file name information that would be embedded in the binary representation of the target program) due to the patching operation and subsequent rebuilding of the binary, as in 640. For example, if it is determined that the patched program would have different file names (or paths to file names) embedded in its binary representation than those in the currently executing binary for the target program, shown as the positive exit from 650, the method may include filtering one or more file name directives so that when the target program is rebuilt to include the source code patch (e.g., the proposed or a modified source code patch), the embedded file name will match those in the current binary, as in 655. In some embodiments, this second pre-processing stage may serve as a container mechanism for the whole build process and may run after a proposed source patch (or a source code patch that has been modified as described above) has been applied to the original source code. In other words, it may run between the original pre-processor and the original compiler stage for an object-specific build process.

As illustrated in this example, after making any necessary changes during the pre-processing stages (or if no changes are needed), the method may include generating a binary representation for the source code patch, including any modifications made during pre-processing, as in 660. Here again, generating a binary representation of the source code patch may include generating a binary representation of the target program as patched and creating the binary representation of the source code patch dependent on the differences between the binary representation of the target program as it is currently executing and the binary representation of the target program as patched. The method may also include applying the binary representation of the source code patch to the binary representation of the target program during execution, as in 670.

Note that although several examples illustrated and described herein involve the patching of binary code for programs that are written in the C/C++ programming languages, that have particular patch formats, and that are executed in systems that implement specific pre-processing macros and/or specific software development tool chains, in other embodiments, these techniques may be applied when performing runtime patching of native-code programs that are written in other programming languages, that have different patch formats, and/or that execute in systems that implement other pre-processing macros and/or tool chains that embed source code information into native-code representations of a patched target program. In various embodiments, the techniques described herein for performing runtime patching of native-code may be applied to perform any of a variety of types of binary hot-patching, including, but not limited to, those described herein. For example, in some embodiments they may be employed in the area of kernel and/or hypervisor hot-patching (where, e.g., having to halt and/or restart the program in order to perform code patching is especially undesirable). In other embodiments, these code patching techniques may be employed in hot-patching for other types of programs (including various client or server applications). In general, these techniques may be applicable for performing runtime code patching for any software entity that is compiled to a native-code representation.

Figure 7:
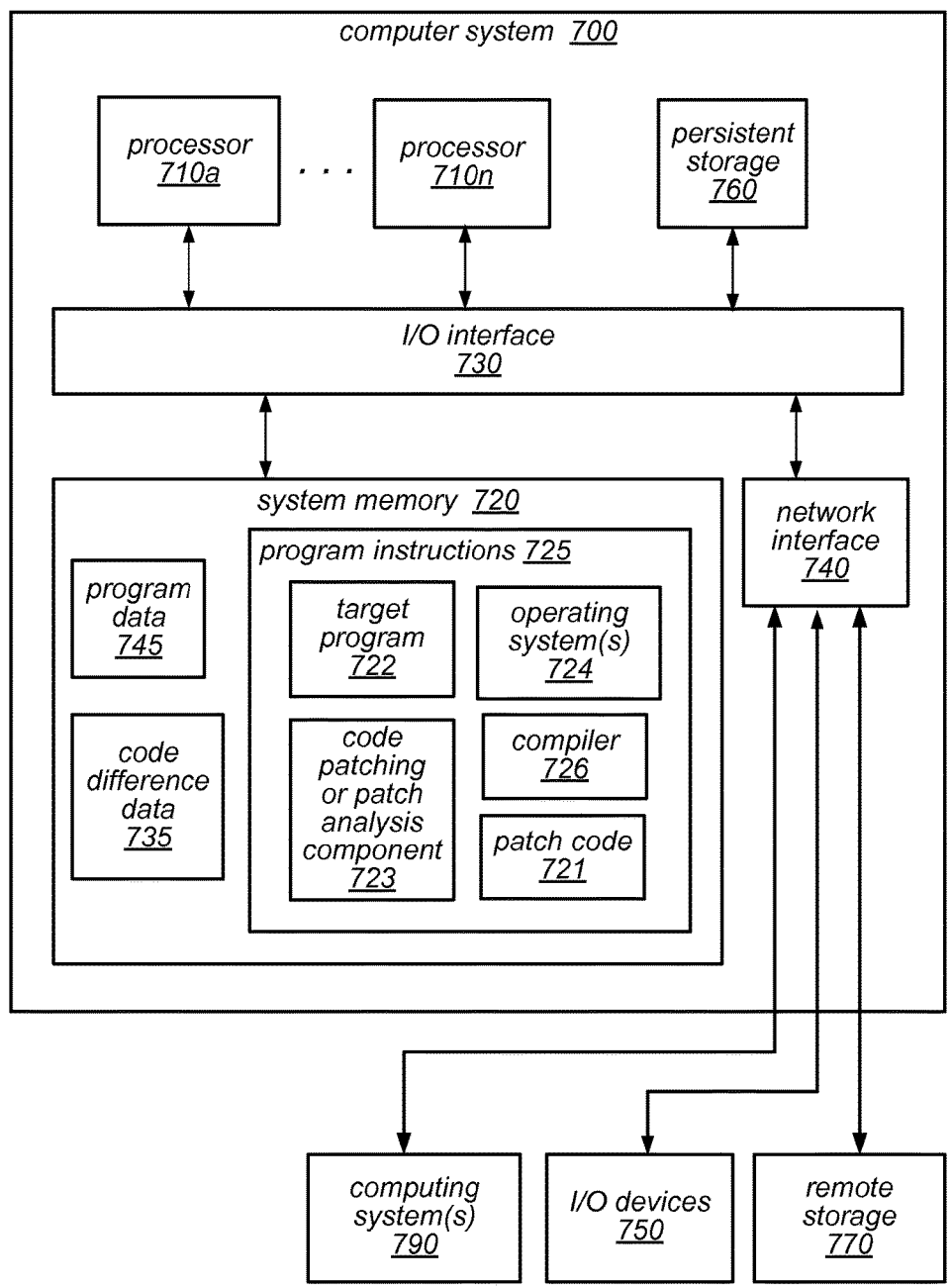
FIG. 7 is a block diagram illustrating a computer system configured to implement the code patching techniques described herein, according to various embodiments.

The methods described herein may in various embodiments be implemented by any combination of hardware and software. For example, in one embodiment, the methods may be implemented by a computer system that includes a processor executing program instructions stored on a computer-readable storage medium coupled to the processor. The program instructions may be configured to implement any or all of the functionality described herein for patching native-code programs, such as binary code representations of software programs, and/or for limiting the effects of source code patches on native-code representations of those target programs. FIG. 7 is a block diagram illustrating a computer system that is configured to implement the code patching techniques described herein, according to various embodiments. Computer system 700 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 700 includes one or more processors 710 (any of which may include multiple cores, which may be single or multi-threaded) coupled to a system memory 720 via an input/output (I/O) interface 730. Computer system 700 further includes a network interface 740 coupled to I/O interface 730. In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA. The computer system 700 also includes one or more network communication devices (e.g., network interface 740) for communicating with other systems and/or components over a communications network (e.g. Internet, LAN, etc.). For example, a client application executing on system 700 may use network interface 740 to communicate with a server application executing on a single server or on a cluster of servers that implement a distributed system. In another example, an instance of a server application executing on computer system 700 may use network interface 740 to communicate with a client application and/or with other instances of the server application that may be implemented on other computer systems.

In the illustrated embodiment, computer system 700 also includes one or more persistent storage devices 760. In various embodiments, persistent storage devices 760 may correspond to disk drives, tape drives, solid state memory, other mass storage devices, or any other persistent storage device. Computer system 700 (or an application, software component, or operating system operating thereon) may store instructions and/or data in persistent storage devices 760, as desired, and may retrieve the stored instruction and/or data as needed.

Computer system 700 includes one or more system memories 720 that are configured to store instructions and data accessible by processor 710. In various embodiments, system memories 720 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 720 may contain program instructions 725 that are executable by processor(s) 710 to implement the methods and techniques described herein (e.g., applying a source code patch to the source code of a target application, determining that it may affect the binary for the target application outside of the patch area, taking steps to limit the effects of the source code patch on the binary for the target application, and generating a binary representation of the source code patch). In various embodiments, program instructions 725 may be encoded in platform native binary, any interpreted language such as Java™ byte-code, or in any other language such as C/C++, Java™, etc., or in any combination thereof. For example, in the illustrated embodiment, program instructions 725 include program instructions executable to implement target program 722 (which may include source code or binary code for an original, intermediate, and/or patched target program), code patching or patch analysis component 723, compiler 726, patch code 721 (which may include a proposed source code patch or a transformed source code patch), and/or operating system(s) 724, which may include any of various operating systems, such as UNIX, LINUX, Solaris™, MacOS™, Windows™, etc.

Any or all of program instructions 725, including target program 722, operating system(s) 724, compiler 726, patch code 721, and/or code patching or patch analysis component 723 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 700 via I/O interface 730. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 740.

In some embodiments, system memory 720 may also include storage for program data 745 and/or a representation of the difference between two source code versions or two native-code versions of a target program 722 (or a portion thereof) that is being, or has been patched (shown as code difference data 735), as described herein. In various embodiments, system memory 720 (e.g., program data 745 within system memory 720) and/or remote storage 770 may store such difference data, or various representations of a code patch to be applied to target program 722, and/or any other information usable in implementing the methods and techniques described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other devices attached to a network, such as other computer systems 790 (which may implement one or more server nodes and/or clients of a distributed system), for example. In addition, network interface 740 may be configured to allow communication between computer system 700 and various I/O devices 750 and/or remote storage 770. Input/output devices 750 may, in some embodiments, include one or more display terminals, keyboards, keypads, touchpads, scanning devices, voice or optical recognition devices, or any other devices suitable for entering or retrieving data by one or more computer systems 700. Multiple input/output devices 750 may be present in computer system 700 or may be distributed on various nodes of a distributed system that includes computer system 700. In some embodiments, similar input/output devices may be separate from computer system 700 and may interact with one or more nodes of a distributed system that includes computer system 700 through a wired or wireless connection, such as over network interface 740. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol. In various embodiments, computer system 700 may include more, fewer, or different components than those illustrated in FIG. 7 (e.g., displays, video cards, audio cards, peripheral devices, other network interfaces such as an ATM interface, an Ethernet interface, a Frame Relay interface, etc.)

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:
1. A method, comprising:
performing by one or more computers:
creating a source code patch for a first source code representation of a software program;
generating a binary update to be applied to a first binary code representation of the software program during execution of the first binary code representation of the software program, wherein generating the binary update comprises:
transforming the source code patch to avoid introducing differences between line number information that is embedded in the first binary code representation of the software program and line number information that will be embedded in a new binary code representation of the software program other than in the portion of the new binary representation of the software program that includes the binary update;
applying the transformed source code patch to the first source code representation of the software program to produce a patched version of the source code representation of the software program;
determining that a representation of a source code file name that will be embedded in the new binary code representation of the software program does not match a representation of a corresponding source code file name that is embedded in the first binary code representation of the software program;
responsive to the determination, transforming the representation of the source code file name that will be embedded in the new binary code representation of the software program prior to creating the new binary code representation of the software program from the patched version of the source code representation of the software program;
creating the new binary code representation of the software program from the patched version of the source code representation of the software program, wherein the new binary code representation includes at least one instance of the transformed representation of the source code file name;
comparing the first binary code representation of the software program to the new binary code representation of the software program; and
generating the binary update, based at least in part on said comparing; and
applying the binary update to the first binary code representation of the software program during execution of the first binary code representation of the software program.

2. The method of claim 1, wherein transforming the source code patch comprises:
applying the source code patch to the first source code representation of the software program to produce an intermediate source code representation of the software program;
performing an operation to compare the intermediate source code representation of the software program to the first source code representation of the software program and to create a representation of the differences between the intermediate source code representation of the software program and the first source code representation of the software program;
determining, based at least in part on the representation of the differences, that applying the source code patch to the first source code representation of the software program changed the number of lines in at least a portion of the source code representation of the software program; and
performing one or more of:
inserting a non-functional line in the source code patch; or
merging the contents of two or more lines in the source code patch onto a single line in the source code patch.

3. The method of claim 1, wherein transforming the source code patch comprises:
applying the source code patch to the first source code representation of the software program to produce an intermediate source code representation of the software program;
performing an operation to compare the intermediate source code representation of the software program to the first source code representation of the software program and to create a representation of the differences between the intermediate source code representation of the software program and the first source code representation of the software program;

determining, based at least in part on the representation of the differences, that applying the source code patch to the first source code representation of the software program changed the number of lines in at least a portion of the source code representation of the software program; and inserting a directive into the source code patch that modifies a line number value that is associated with the line in the source code patch on which the directive is inserted.

4. The method of claim 1, wherein applying the binary update to the first binary code representation of the software program comprises inserting the binary update into the memory in which the first binary code representation of the software program is located such that a sequence of native-code program instructions in the memory are replaced by another sequence of native-code program instructions.

5. A system, comprising:
one or more processors; and
a memory coupled to the one or more processors;
wherein the memory stores a native-code representation of a program that is executable by the one or more processors; and
a code patching component;
wherein during execution of the program and the code patching component, the code patching component is configured to:
receive a source code patch representing an update that is directed to a given portion of the program;
perform one or more operations to ensure that, when the update represented by the source code patch is applied to a source code representation of the given portion of the program, changes to the native-code representation of the program in one or more other portions of the program are reduced or avoided, including:
determine that a representation of a source code file name that will be embedded in a new native-code representation of the program does not match a representation of a corresponding source code file name that is embedded in a native-code representation of the program;
responsive to the determination, transforming the representation of the source code file name that will be embedded in the new native-code representation of the program prior to creating the new native-code representation of the program from the patched version of the source code representation of the software program; and
apply the update to the given portion of the program, wherein to apply the update to the given portion of the program, the code patching component:
applies the source code patch to the source code representation of the given portion of the program or applies a modified source code patch representing the update to the source code representation of the given portion of the program to produce an intermediate source code representation of the program,
creates the new native-code representation of the program from the intermediate source code representation of the program and replaces at least one instance of the representation of the source code file name in the new native-code representation with the transformed representation of the source code file name,
compares the native-code representation of the program to the new native-code representation of the program, and
generates a native-code patch dependent at least in part on the comparison.

6. The system of claim 5,
wherein the one or more operations comprise an operation to generate the modified source code patch from the source code patch that, when applied to the source code representation of the given portion of the program, isolates changes to the native-code representation of the program to the given portion of the program; and
wherein to apply the update to the given portion of the program, the code patching component is configured to apply the modified source code patch to the source code representation of the given portion of the program.

7. The system of claim 5,
wherein the one or more operations comprise an operation to determine whether applying the source code patch to the source code representation of the given portion of the program would cause a change to the native-code representation of the program in one or more other portions of the program; and
wherein to apply the update to the given portion of the program, the code patching component is configured to apply the source code patch to the source code representation of the given portion of the program in response to determining that applying the source code patch to the source code representation of the given portion of the program would not cause a change to the native-code representation of the program in any other portions of the program.

8. The system of claim 5,
wherein the one or more operations comprise:
an operation to determine whether applying the source code patch to the source code representation of the given portion of the program would cause a change to the native-code representation of the program in one or more other portions of the program; and
an operation to generate, in response to determining that applying the source code patch to the source code representation of the given portion of the program would cause a change to the native-code representation of the program in one or more other portions of the program, the modified source code patch from the source code patch that, when applied to the source code representation of the given portion of the program, isolates changes to the native-code representation of the program to the given portion of the program; and
wherein to apply the update to the given portion of the program, the code patching component is configured to apply the modified source code patch to the source code representation of the given portion of the program.

9. The system of claim 8,
wherein to determine that applying the source code patch to the source code representation of the given portion of the program would cause a change to the native-code representation of the program in one or more other portions of the program, the code patching component is configured to determine that applying the source code patch to the source code representation of the given portion of the program changes the number of lines in the source code representation of the given portion of the program; and wherein the change to the native-code representation of the program comprises a change to line number information that is embedded in the native-code representation of the program in one or more other portions of the program.

10. The system of claim 9,
wherein to generate the modified source code patch, the code patching component is configured to perform one or more of:
  inserting an additional line in the modified source code patch; or
  merging the contents of two or more lines in the source code patch onto a single line in the modified source code patch.

11. The system of claim 10,
wherein merging the contents of two or more lines in the source code patch onto a single line in the modified source code patch is based, at least in part, on the syntax of the programming language in which the source code patch is written; and
wherein merging the contents of the two or more lines does not change the semantics of the source code patch.

12. The system of claim 10, wherein merging the contents of two or more lines in the source code patch onto a single line in the modified source code patch comprises merging the contents of more than two lines in the source code patch onto a single line in the modified source code patch.

13. The system of claim 9, wherein to generate the modified source code patch, the code patching component is configured to insert a directive into the modified source code patch that modifies a line number value for the line in the modified source code patch on which the directive is inserted.

14. The system of claim 5,
wherein the one or more operations comprise an operation to determine whether applying the source code patch to the source code representation of the given portion of the program would cause a change to the native-code representation of the program in one or more other portions of the program; and
wherein to determine whether applying the source code patch to the source code representation of the given portion of the program would cause a change to the native-code representation of the program in one or more other portions of the program, the code patching component is configured to:
  apply the source code patch to a current source code representation of the program to produce an intermediate source code representation of the program;
  perform an operation to compare the intermediate source code representation of the program to the current source code representation of the program and to create a representation of the differences between the intermediate source code representation of the program and the current source code representation of the program; and
  determine, based at least in part on the representation of the differences, whether applying the source code patch to the source code representation of the given portion of the program would cause a change to the native-code representation of the program in one or more other portions of the program.

15. The system of claim 5,
wherein to apply the update to the given portion of the program, the code patching component is further configured to:
  insert the native-code patch into the native-code representation of the given portion of the program.

16. The system of claim 15,
wherein, prior to creating the new native-code representation of the program from the intermediate source code representation of the program, the code patching component is further configured to:
  canonicalize a representation of a source code file name that is embedded in the native-code representation of the program;
  canonicalize a representation of a corresponding source code file name that was determined during a pre-processing operation and that will be embedded in the new native-code representation of the program created from the intermediate source code representation of the program;
  determine that the representation of the source code file name that is embedded in the native-code representation of the program does not match the representation of the corresponding source code file name that was determined during the pre-processing operation and that will be embedded in the new native-code representation of the software program; and
  transform the representation of the corresponding source code file name that was determined during the pre-processing operation and that will be embedded in the new native-code representation of the software program so that it matches the representation of the source code file name that is embedded in the native-code representation of the program.

17. The system of claim 16,
wherein to transform the representation of the corresponding source code file name that was determined during the pre-processing operation, the code patching component is configured to transform the corresponding source code file name in another pre-processing stage that follows the pre-processing operation during which the corresponding source code file name was determined; and
wherein the pre-processing operation during which the corresponding source code file name was determined comprises a pre-processing operation in which the modified source code patch was generated from the source code patch such that when the modified source code patch is applied to the source code representation of the given portion of the program, changes to the native-code representation of the program are isolated to the given portion of the program.

18. The system of claim 16,
wherein to transform the representation of the corresponding source code file name that was determined during the pre-processing operation and that will be embedded in the new native-code representation of the software program so that it matches the representation of the source code file name that is embedded in the native-code representation of the program, the code patching component is configured to:
  identify one or more portions of the representation of the corresponding source code file name that was determined during the pre-processing operation and that will be embedded in the new native-code representation of the software program that are different than corresponding portions of the representation of the source code file name that is embedded in the native-code representation of the program;

replace the one or more portions of the representation of the corresponding source code file name that was determined during the pre-processing operation and that will be embedded in the new native-code representation of the software program with the corresponding portions of the representation of the source code file name that is embedded in the native-code representation of the program.

19. A non-transitory computer-readable storage medium storing program instructions that when executed on one or more computers cause the one or more computers to implement a patch code analysis tool, wherein the patch code analysis tool is configured to:
receive a source code representation of at least a portion of a software application;
receive a proposed source code patch for updating the at least a portion of the software application;
ensure that, when a modified version of the proposed source code patch is applied to the source code representation of the at least a portion of the software application, changes introduced into a native-code representation of the software application outside of the portion of the native-code representation corresponding to the at least a portion of the software application by the application of the modified version of the proposed source code patch will be reduced or avoided, including:
determine that a representation of a source code file name that will be embedded in a new native-code representation that corresponds to an update to the at least a portion of the software application according to the proposed source code patch, does not match a representation of a corresponding source code file name that is embedded in the native-code representation of the at least a portion of the software program;
responsive to determining that the representation of a source code file name that will be embedded in the new native-code representation of the update to the at least a portion of the software application does not match the representation of the corresponding source code file name that is embedded in the native-code representation of the source code representation of the at least a portion of the software application, transform the representation of the source code file name that will be embedded in the new native-code representation of the at least a portion of the software application prior to creating the new native-code representation of the at least a portion of the software application; and
apply the update to the at least a portion of the software application, wherein to apply the update, the patch code analysis tool is configured to:
apply the source code patch to the source code representation of the at least a portion of the software application or apply a modified source code patch representing the update to the source code representation of the at least a portion of the software application, to produce an intermediate source code representation of the at least a portion of the software application,
create the new native-code representation of the at least a portion of the software application from the intermediate source code representation of the at least a portion of the software application, and replace at least one instance of the representation of the source code file name in the new native-code representation with the transformed representation of the source code file name,
compare the native-code representation of the at least a portion of the software application to the new native-code representation of the at least a portion of the software application, and
generate a native-code patch dependent at least in part on the comparison.

20. The non-transitory computer-readable storage medium of claim 19, wherein to ensure that, when the modified version of the proposed source code patch is applied to the source code representation of the at least a portion of the software application, changes introduced into the native-code representation of the software application outside of the portion of the native-code representation corresponding to the at least a portion of the software application by the application of the modified version of the proposed source code patch will be reduced or avoided, the patch code analysis tool is further configured to: return a response indicating that the modified version of the proposed patch should be generated.

21. The non-transitory computer-readable storage medium of claim 19,
wherein to ensure that, when the modified version of the proposed source code patch is applied to the source code representation of the at least a portion of the software application, changes introduced into the native-code representation of the software application outside of the portion of the native-code representation corresponding to the at least a portion of the software application by the application of the modified version of the proposed source code patch will be reduced or avoided, the patch code analysis tool is further configured to perform one or more of:
inserting a line in the proposed source code patch;
merging the contents of two or more lines in the proposed source code patch onto a single line in the proposed source code patch; or
inserting a directive into the proposed source code patch that modifies a line number value for the line in the proposed source code patch on which the directive is inserted.

22. The non-transitory computer-readable storage medium of claim 19,
wherein the patch code analysis tool is further configured to:
receive one or more other proposed source code patches, each of which is proposed for updating a respective other portion of the software application; and
for at least one of the other proposed source code patches:
ensure that, when a modified version of the other source code patch is applied to the source code representation of the respective other portion of the software application, changes introduced into the native-code representation of the software application outside of the portion of the native-code representation corresponding to the respective other portion of the software application by the application of the modified version of the other source code patch will be reduced or avoided.

* * * * *